US006333987B1

(12) United States Patent
Reinhard et al.

(10) Patent No.: US 6,333,987 B1
(45) Date of Patent: Dec. 25, 2001

(54) PROCESS FOR ASSESSING THE QUALITY OF PROCESSED MATERIAL

(75) Inventors: Gerald Josef Reinhard, Sulzfeld; Johannes Georg Schaede, Würzburg, both of (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/147,072

(22) PCT Filed: Apr. 1, 1997

(86) PCT No.: PCT/DE97/00655

§ 371 Date: Oct. 1, 1998

§ 102(e) Date: Oct. 1, 1998

(87) PCT Pub. No.: WO97/36749

PCT Pub. Date: Oct. 9, 1997

(30) Foreign Application Priority Data

Apr. 2, 1996 (DE) ............................................. 196 13 083

(51) Int. Cl.[7] ....................................................... G06K 9/00

(52) U.S. Cl. .......................... 382/112; 382/100; 250/571

(58) Field of Search .................................... 382/112, 100; 250/571, 572, 559, 562; 356/394, 238; 204/486

(56) References Cited

U.S. PATENT DOCUMENTS

| | | | | |
|---|---|---|---|---|
| 3,812,373 | | 5/1974 | Hosoe et al. | 255/559.39 |
| 4,561,103 | * | 12/1985 | Horiguchi et al. | 382/1 |
| 4,677,680 | * | 6/1987 | Harima et al. | 382/1 |
| 4,736,446 | * | 4/1988 | Reynolds et al. | 382/8 |
| 5,062,359 | | 11/1991 | Giori | 101/152 |
| 5,115,144 | | 5/1992 | Konishi et al. | 250/559.45 |
| 5,187,376 | | 2/1993 | Hashimoto et al. | 255/559.02 |
| 5,283,623 | | 2/1994 | Muhlberg et al. | 356/430 |
| 5,305,392 | | 4/1994 | Longest, Jr. | 382/112 |
| 5,317,390 | | 5/1994 | Bolza-Schünemann | 356/394 |
| 5,384,859 | | 1/1995 | Bolza-Schünemann | 382/112 |
| 5,724,437 | * | 3/1998 | Bucher et al. | 382/112 |
| 5,908,541 | * | 6/1999 | Castegnier | 204/486 |

FOREIGN PATENT DOCUMENTS

| | | | |
|---|---|---|---|
| 2338849 | 2/1974 | (DE) | G06K/9/00 |
| 3713525 | 10/1987 | (DE) | G06K/9/00 |
| 4124397 | 4/1992 | (DE) | G06K/9/00 |
| 4129126 | 3/1993 | (DE) | G06K/9/00 |
| 4206366 | 3/1993 | (DE) | G06K/9/00 |
| 4432371 A1 | 3/1993 | (DE) | G06K/9/00 |
| 4321177 | 1/1995 | (DE) . | |
| 127831 | 12/1984 | (EP) | G06K/9/00 |
| 406157 | 1/1991 | (EP) | G06K/9/00 |
| 554811 | 8/1993 | (EP) | G06K/9/00 |
| 4-223169 | 8/1992 | (JP) . | |

* cited by examiner

*Primary Examiner*—Leo Boudreau
*Assistant Examiner*—M. B Choobin
(74) *Attorney, Agent, or Firm*—Jones, Tullar and Cooper

(57) ABSTRACT

Image areas that have been printed by specific printing plates or areas are coordinated with those specific plates or areas. A counter is coordinated with each specific image area and specific plate or area which prints it. If a predetermined number of faults are counted, a signal is generated and can be used to shut down the press or to advise the press operator of the existence of the recurring fault.

7 Claims, 2 Drawing Sheets

PROCESS FOR ASSESSING THE QUALITY OF PROCESSED MATERIAL

FIELD OF THE INVENTION

The present invention relates to processes for qualitative assessment of processed material.

DESCRIPTION OF THE PRIOR ART

DE-OS 38 849 describes a process for detecting faults on rolled steel surfaces. In the process those faults, which have a defined periodicity, are identified.

DE 41 29 196 A1 discloses a process for detecting faults in a textile web. Here, the number of consecutive faults is added up. When a fault-free product appears, the counter setting is returned to zero.

SUMMARY OF THE INVENTION

It is the object of the present invention to provide a process for the qualitative assessment of processed material.

This object is attained in accordance with the invention by the utilization of a process for the qualitative assessment of material by utilization of at least one photoelectric sensor and an evaluation device which acts with it. Image areas of the inspected material are detected in association with possible fault sources. Each printing plate or forme on a printing cylinder which is provided with a plurality of identical printing formes that are arranged one behind the other is determined as the fault source.

Faults in the material to be inspected are systematically detected in an advantageous manner by means of the processes of the present invention. Locating a fault is made easier by means of the specific detection of occurring faults, and their assignment to an associated fault source. Waste and down-times of the processing machine are reduced.

In this way, a clear association of faults to the fault-generating printing forme is possible, in particular in connection with rotary printing presses (see EP 0 406 157 B1) having a printing cylinder with a plurality of identical printing formes.

A dependable fault assessment is achieved by counting up and down in accordance with the number of successive faulty and fault-free image areas.

In connection with faults because of insufficient wiping of the inked printing formes of a steel engraving printing press in particular, it often occurs that only one fault-free sheet follows several faulty sheets, and then is again followed by several faulty sheets. If, in this case, the number of faulty sheets has almost reached an upper threshold value, the counter setting is only reduced by one as a result of this single fault-free sheet, and the counter setting is increased again by the following faulty sheets. Therefore the threshold value of the counter setting is rapidly reached and a warning signal is triggered. Unnecessary waste is reduced by this.

BRIEF DESCRIPTION OF THE DRAWINGS

The process in accordance with the invention will be described in greater detail in what follows and as depicted schematically in the accompanying drawings in which.

DESCRIPTION OF THE PREFERRED EMBODIMENT

Figure 1:
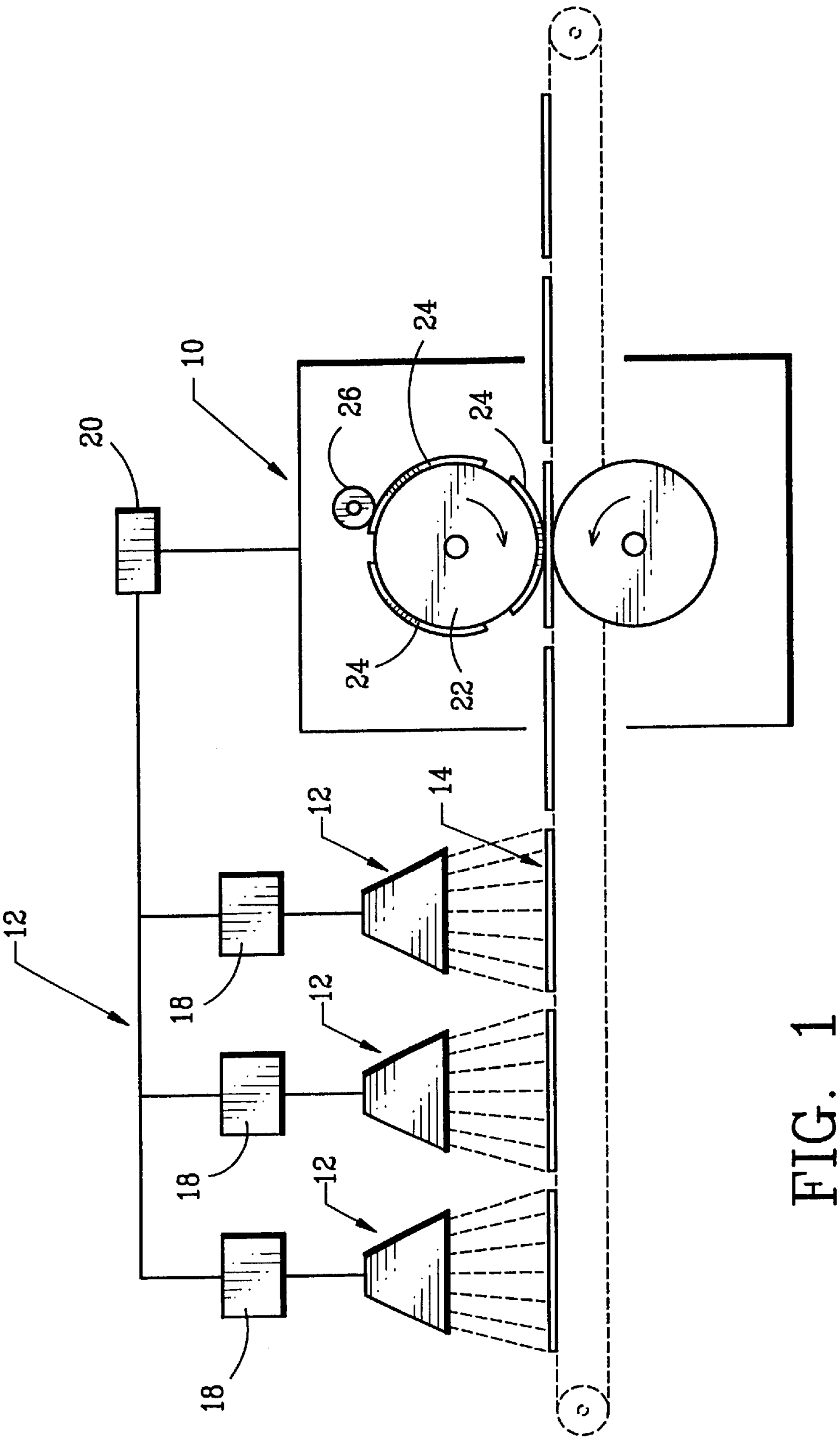
FIG. 1 is a schematic side elevation view of a printing press and sheet inspection device in accordance with the present invention.

A processing machine, for example a rotary printing press, generally at 10, as seen in FIG. 1, is provided with a device 12 for the qualitative assessment of processed material. This processed material can be printed sheet 14 or webs, for example. In the present embodiment sheets of paper 14 are printed by means of the steel engraving process and are thereafter qualitatively assessed in-line.

The rotary printing press 10 can be a steel engraving printing press, for example known from EP 0 406 157 B1.

A process for assessing these sheets is known from DE 42 06 366 A1, for example.

Figure 2:
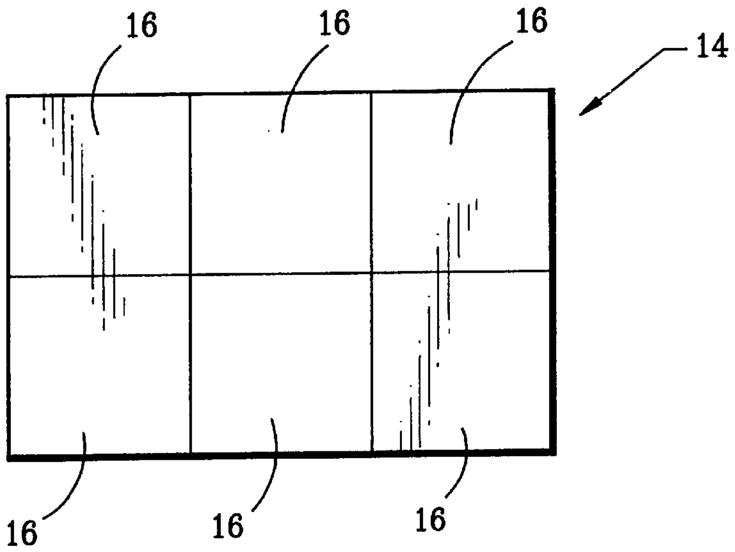
FIG. 2 is a top plan view of a printed sheet having image areas.
Figure 3:
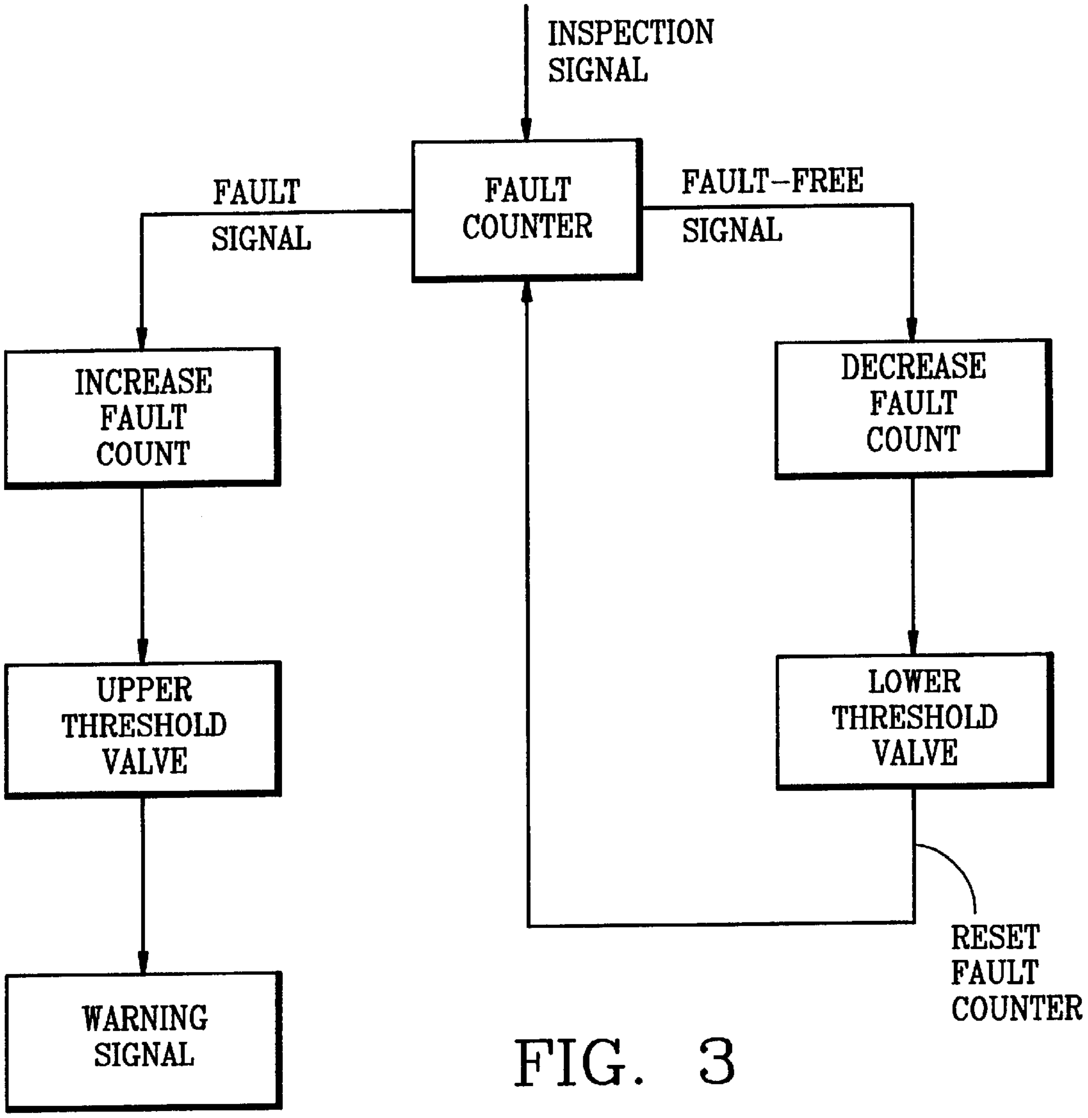
FIG. 3 is a flow chart of the process of assessing the quality of processed material in accordance with the present invention.

In accordance with the process for assessing the quality of processed material in accordance with the present invention, image elements 16 of a sheet 14 to be inspected, as seen in FIG. 2, are compared with stored image elements of so-called "master" sheets. If one or several measured values are outside of a predetermined tolerance of the corresponding measured values of the "master" sheet, a fault is detected. This fault can now be signaled visually or acoustically by means of a first warning signal. It is also possible to mark or remove the respective sheet 14 containing a fault. A signal regarding the faulty sheet is supplied to a counter 18, by means of which the counter setting of a counting unit is increased by one, for example. Now if one or several faulty sheets 14 directly follow the first faulty sheet, the counter setting of the counter 18 is increased by one for each faulty sheet, as depicted in FIG. 3. Only with faults occurring directly one after the other does the counter 18 increase the counter setting by respectively one counting unit, for example raising it by one.

If a fault-free sheet 14 is detected following a faulty sheet, a signal for the fault-free sheet is supplied to the counter 18, by means of which the counter setting is reduced in steps by a counting unit, for example one. If now further fault-free sheets 14 follow directly one after the other, the counter setting is respectively reduced by one for each fault-free sheet. If the counter has reached a lower threshold value, for example the value zero, no further downward counting is performed.

Thus, the counter setting is changed in steps corresponding to the number of inspected faulty and fault-free sheets. This procedure is followed within a range of the counter setting from a lower threshold value, for example zero, up to a selectable upper threshold value of the counter setting, which can be set. If this threshold value has been reached, a second warning signal is triggered and is supplied to the press control 20, for example. This signal can cause the reduction of the speed of the rotary printing press 10 for example, or the stopping of the rotary printing press 10.

This process can be applied to the total number of sheets to be inspected.

The sheets to be inspected are often processed in machines in which cyclical faults can occur. For example, this is the case when the sheets are printed by a rotary printing press such as the type of press disclosed in EP 0 406 157 B1.

This rotary printing press 10 has a plate cylinder 22, which is provided with three printing plates 24, each of which has an identical printing forme. After inking, the non-printing areas of these printing formes are cleaned of printing ink by a common wiping device. This wiping device consists, inter alia, of a wiping cylinder 26 applied under pressure against the printing formes 24. Now, if for example one of the three printing plates 24 is damaged, or part of it lies slightly lower, the wiping device 26 does not completely clean this area. Therefore each third sheet 14 in the stream of all of the sheets 14 produced would have a fault in the nature of a scumming area.

Scumming areas, however, can also sometimes occur over only a limited period of time, for example because of slugs, which slugs are eventually removed from the printing plate by the wiping device.

In this example, each printing plate 24 is assigned its own counter 12. This counter is synchronized with the rotational speed of the printing press and with the inspection device. A signal of a fault-free, or respectively of a faulty sheet being printed by means of a defined printing plate is supplied only to the counter assigned to this printing plate.

Thus, only signals from the sheets printed by means of the associated printing plate 24 and inspected are supplied to each counter 18 assigned to this printing plate 24.

This respective counter 18 can be operated in accordance with the following principle:

If a faulty sheet is detected, a signal is supplied to the respective counter 18, as depicted in FIG. 3, by means of which the counter setting is increased by a counting unit, for example one. This takes place in connection with successive sheets up to a predeterminable threshold value. When a fault-free sheet is detected, the counter setting is returned to zero, and counting up of the counter setting restarts only when a faulty sheet again appears. When this threshold value has been reached, a second warning signal is issued, which is passed on, for example, to the printer control 20 for triggering further actions.

The process described at the outset is used in a particularly advantageous manner for the counting operation of these cyclically occurring faults. In accordance with this, the step-by-step counting up and down of the counter setting takes place as a function of the respective number of faulty and fault-free sheets.

This counting of cyclic faults is not only limited to the described example of plate cylinders with several printing plates, wherein the cyclical faults of successive sheets or repeats of the web are detected. Other cases of use are also possible. In this case at least one individual counter is assigned to each relevant one of several possible fault sources which generate a cyclical fault.

For example, it is also possible to determine partial areas 16, i.e. windows, within a sheet, to which an individual counter is assigned.

It is of course also possible to perform the count by means of other counting units or step sizes i.e. a step size not one, and with other threshold values.

While a preferred embodiment of a process for assessing the quality of processed material in accordance with the present invention has been set forth fully and completely hereinabove, it will be apparent to one of skill in the art that a number of changes in, for example, the specific type of printing press used, the type of paper being printed on and the like could be made without departing from the true spirit and scope of the present invention which is accordingly to be limited only the following claims.

What is claimed is:

1. A process for the qualitative assessment of material including:

providing at least one photoelectric sensor and an evaluation device acting with it;

providing a rotary printing press having a printing cylinder;

providing several printing forms on said printing cylinder;

identifying each of said several printing forms on said printing cylinder as a separate fault source;

forming a plurality of printed image areas on the material using said several printing forms;

assigning each one of said plurality of printed image areas formed on the material to its associated one of said several printing forms;

detecting faulty and fault-free ones of said plurality of printed image areas formed on the material using said at least one photoelectric sensor and said evaluation device acting with it;

associating each faulty one of said plurality of printed image areas formed on the material with an associated one of said separate fault sources;

providing a separate counter for each one of said separate fault sources;

increasing a counter setting of each said separate counter upon detecting a faulty one of said printed image areas formed by said associated one of said separate fault sources; and decreasing said counter setting of each said separate counter upon detecting a fault-free one of said printed image areas formed by said associated one of said separate fault sources.

2. A process for the qualitative assessment of printed material including:

providing at least one photoelectric sensor and an evaluation device acting with it;

providing a plurality of pieces of printed material;

providing an image area on each of the plurality of pieces of printed material to be assessed. providing a counter having a changeable counter setting;

assigning said counter to said image area;

detecting faulty and fault-free ones of said image area utilizing said at least one photoelectric sensor and said evaluation unit associated with it;

increasing said counter setting by one counting unit when one of said plurality of image areas is faulty;

decreasing said counter setting by one counting unit when one of said plurality of image areas is fault-free;

providing an upper threshold value for said counter setting;

activating a signal when said counter setting reaches said upper threshold value;

providing a lower threshold value for said counter setting; and decreasing said counter setting only as low as said lower threshold value.

3. The method of claim 2 further including increasing said counter setting by one counting unit when said image area is faulty and decreasing said counter setting by one counting unit when said image area is fault-free.

4. The process of claim 1 further including utilizing said printing cylinder to print entire sheets and designating each of said sheets as said image area.

5. The process of claim 1 further including utilizing said printing cylinder to print a repeat on a web and designating each such repeat as an image area.

6. The process of claim 2 further including selecting said image area as an entire sheet of printed material.

7. The process of claim 2 further including selecting said image area as a repeat on a web of printed material.

* * * * *